United States Patent [19]
Bannister

[11] Patent Number: 6,016,425
[45] Date of Patent: Jan. 18, 2000

[54] HYBRID MULTIZONE CALL DELIVERY SYSTEM

[75] Inventor: Cecil H. Bannister, Richardson, Tex.

[73] Assignee: Nortel Networks Corporation, Montreal, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/718,010

[22] Filed: Sep. 3, 1996

Related U.S. Application Data

[63] Continuation of application No. 08/366,546, Dec. 29, 1994, abandoned.

[51] Int. Cl.$^7$ ...................................................... H04Q 7/20
[52] U.S. Cl. ........................ 455/422; 455/410; 455/433; 455/445
[58] Field of Search ................. 379/56–61; 455/33.1, 455/33.2, 54.1, 56.1, 422, 432, 433, 435, 436, 445, 517, 524, 554, 560, 561, 410, 411, 518, 456, 458

[56] References Cited

U.S. PATENT DOCUMENTS

| | | | |
|---|---|---|---|
| 5,090,051 | 2/1992 | Muppidi et al. | 379/61 |
| 5,438,608 | 8/1995 | Kojima | 455/411 |
| 5,448,760 | 9/1995 | Frederick | 455/410 |
| 5,463,672 | 10/1995 | Kage | 379/59 |
| 5,467,382 | 11/1995 | Schorman | 455/410 |
| 5,497,412 | 3/1996 | Lannen et al. | 379/60 |
| 5,519,758 | 5/1996 | Tabbane | 455/433 |
| 5,555,551 | 9/1996 | Rudokas et al. | 455/410 |
| 5,557,654 | 9/1996 | Maenpaa | 455/411 |
| 5,610,972 | 3/1997 | Emery et al. | 455/433 |
| 5,613,209 | 3/1997 | Peterson et al. | 455/518 |
| 5,694,393 | 12/1997 | Kaye | 455/518 |

FOREIGN PATENT DOCUMENTS

| | | |
|---|---|---|
| 93/05604 | 3/1993 | WIPO . |
| 93/23965 | 11/1993 | WIPO . |

*Primary Examiner*—Dwayne D. Bost
*Assistant Examiner*—Nay Maung
*Attorney, Agent, or Firm*—Foley & Lardner

[57] ABSTRACT

A hybrid multizone call delivery system delivers calls to portables by broadcasting from a central node a portable identification number (PIN) and dial-in number (DN) to all the zones in the system. Portables register their presence in zones as they roam throughout the coverage area. When a zone matches a broadcast PIN to a PIN registered therein, a zone controller pages the portable and initiates a call back to the broadcast DN. Upon receipt of the call back, the central node connects the incoming call to the portable through the call back connection.

19 Claims, 8 Drawing Sheets

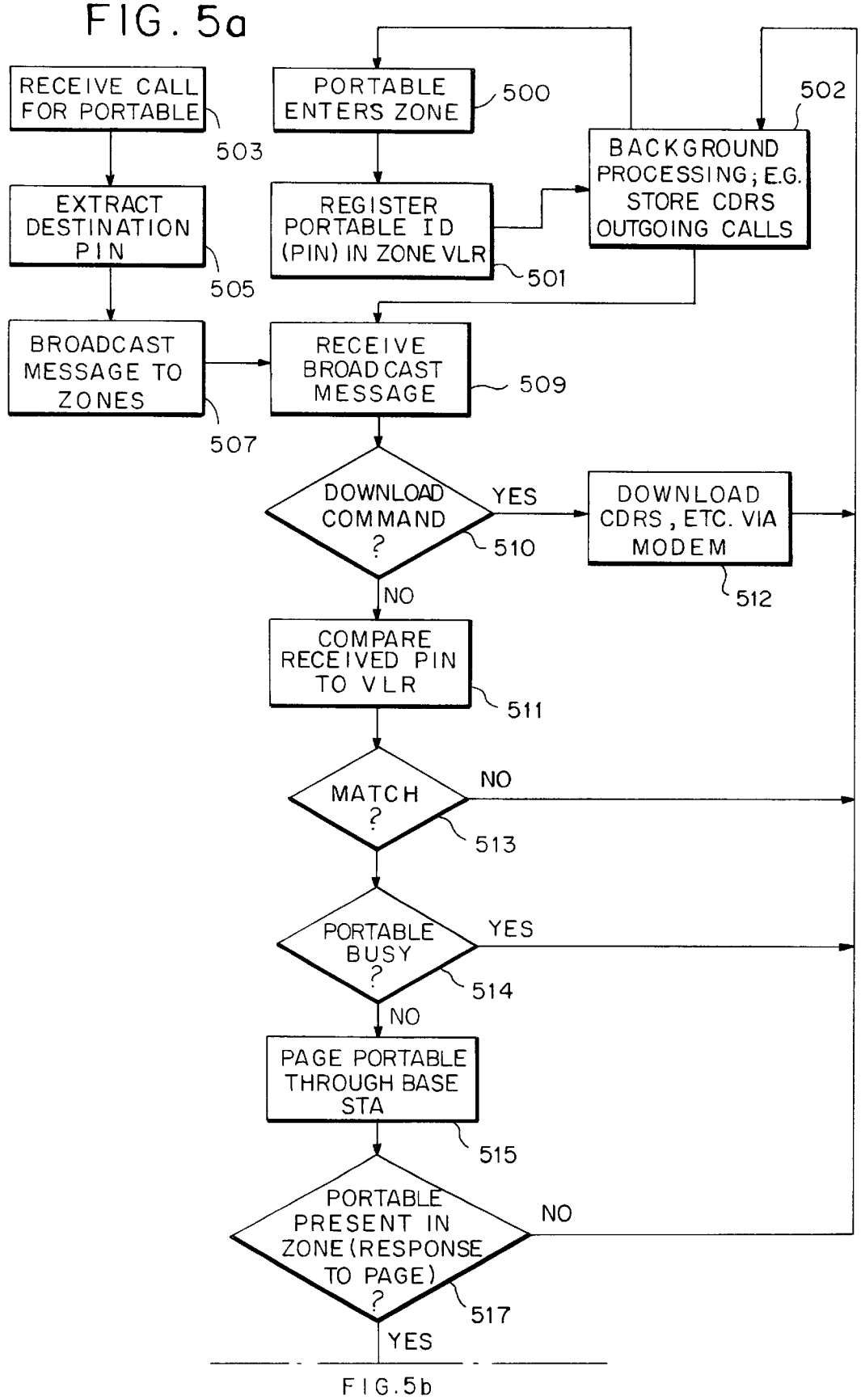

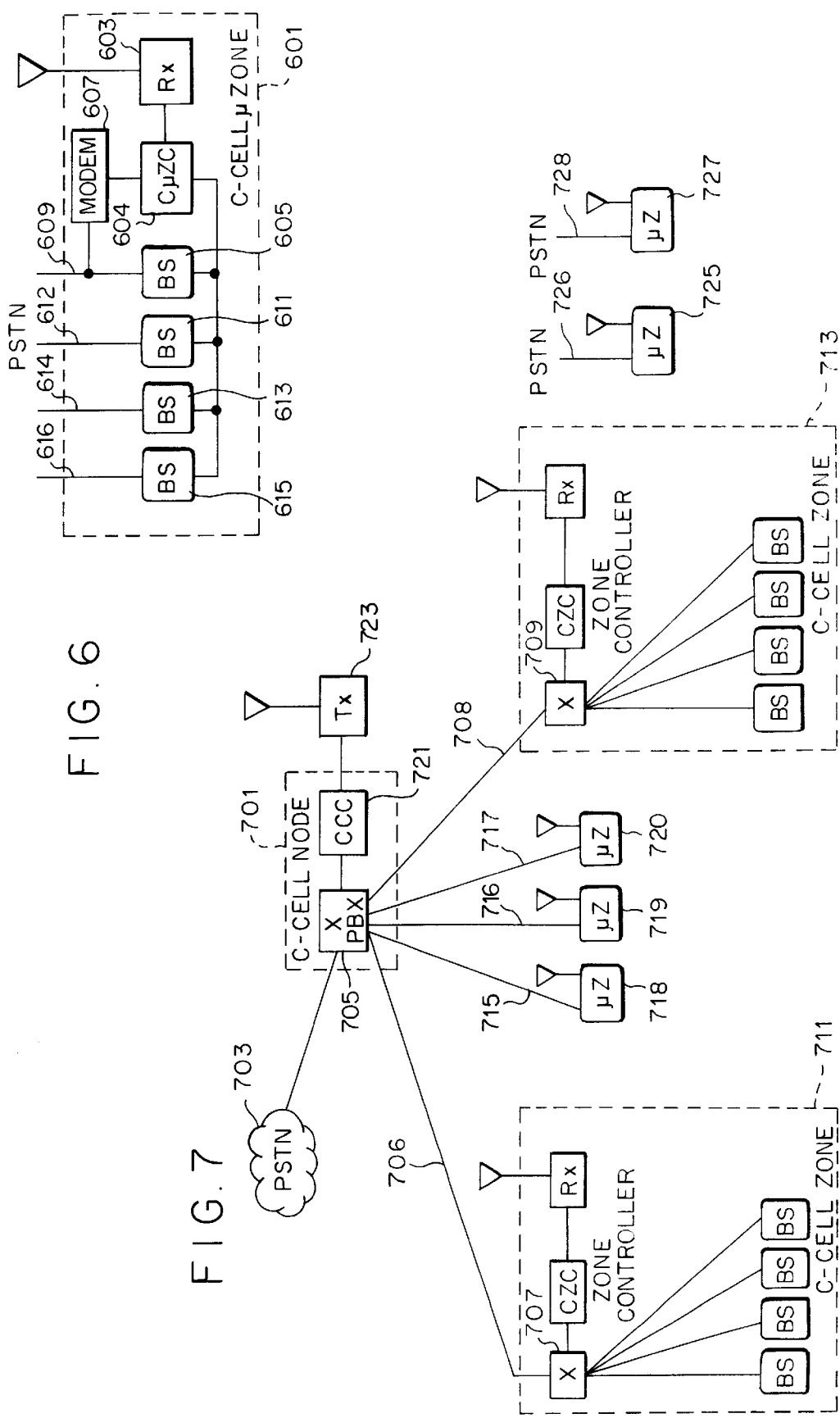

HYBRID MULTIZONE CALL DELIVERY SYSTEM

This application is a continuation of application Ser. No. 08/366,546, filed Dec. 29, 1994 now abandoned.

FIELD OF THE INVENTION

The invention relates to wireless telecommunications systems. In particular, the invention relates to a telecommunication system which avoids communication bottlenecks by employing radio communication techniques for fast one way communication and alternate communication media for other communications, such as information downloading by modems.

RELATED ART

CT2 and $\mu$ cellular system zones provide islands of coverage which must be networked with a central node in order to provide two-way communications for roaming users.

In conventional versions of such systems, when a roaming portable enters a zone, the portable initiates a registration process. In this registration process the ID and location of the portable device is communicated to a central node to update a Home Location Register (HLR) in the central node. The central node uses the information in its Home Location Register to deliver an incoming call to the portable at the zone where that portable is registered. This call delivery process requires an immediate interchange of messages between the node and the zone. The need for immediate message exchange, thus live links, is a key requirement for such conventional system implementations. Communication bottlenecks are a likely result.

One result of this requirement for live links between node and zones is that it becomes a burden from both a hardware and software perspective to manage a large number of zones from a node. For example, a city-wide system may have thousands of zones. The conventional system discussed above is not cost effective in such applications because each zone requires a modem and a line to the public switched telephone network (PSTN) or other network at the node. Moreover, a concentrator is likely to be required, increasing the cost and management complexity even further. Alternatives using a data packet network (DPN) are also prohibitively expensive.

SUMMARY AND OBJECTS OF THE INVENTION

In view of the difficulties and limitations associated with conventional systems as discussed above, it is an object of the invention to provide a system which reduces communication bottlenecks and avoids the requirement for such live links.

It is still another object of the invention to provide a system which eliminates the need for the central node to maintain a list of locations of portables.

It is a further object of the invention to reduce hardware and software requirements for such systems, thereby providing a more cost effective system.

It is a still further object of the invention to provide a single system which can be used in public, private and centrex and other wireless applications.

It is another object of the invention to provide a system which accommodates zone growth and can be easily deployed.

The above and other objects are accomplished by a communication network according to the invention which includes a central node and a zone controller. The central node works to establish a communication link between an incoming call received at the central node and a portable in a zone cell controlled by the zone controller. The zone controller registers an identifier of a portable, for example in a memory called a visitor location register, as the portable enters the zone. The zone controller is responsive to an indication, such as a broadcast of the destination portable identification number (PIN), of an incoming call from the central node to page the portable. The zone controller signals the central node to establish the communication link if the portable is in the respective zone to receive the incoming call. This signalling of the central node can be accomplished, for example, by initiating a call back to the central node on a number broadcast by the central node. Alternative protocols can be implemented if the portable is not present in any of the zones or is otherwise unavailable, e.g., the busy or don't answer conditions.

BRIEF DESCRIPTION OF THE DRAWINGS

The above and other objects are accomplished by a method and apparatus as described further herein with reference to the drawings in which:

FIGS. 5a and 5b are a flow diagrams generally illustrating operation of a system according to the invention;

FIG. 6 illustrates an architecture for a C-cell $\mu$ Zone according to the invention;

FIG. 7 illustrates an architecture for a private system according to the invention;

DETAILED DESCRIPTION OF THE PREFERRED EMBODIMENTS

Figure 1:
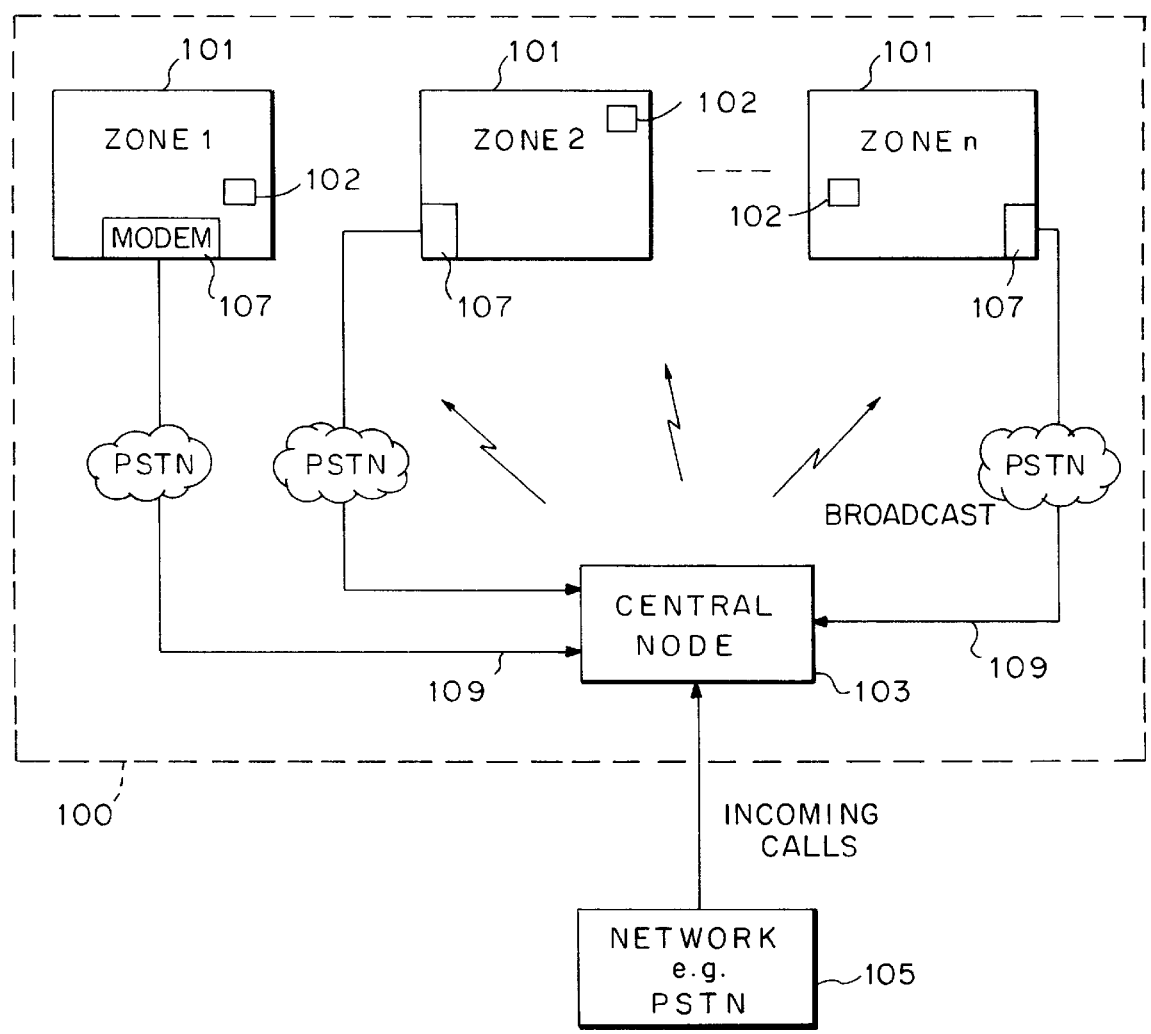
FIG. 1 is a block diagram of a system according to the invention.

FIG. 1 illustrates an example of a telecommunications system having a service area 100 with one or more predefined geographic zones 101 among which portable telecommunications sets 102 (portables) can roam. The three zones shown are by way of example as any number of zones can be used. Each portable has a unique portable identification number (PIN) in order to distinguish it from other portables. The zoned telecommunications system according to the invention also has a central node 103 which receives incoming calls from a public switch telecommunications network PSTN 105. Each zone also has a dial up modem 107 communicatively linked to the central node through the PSTN on line 109, if needed. Since the zones transmit information over the modems relatively infrequently in response to a request from the central node, the central node modem becomes a shared resource.

Figure 2:
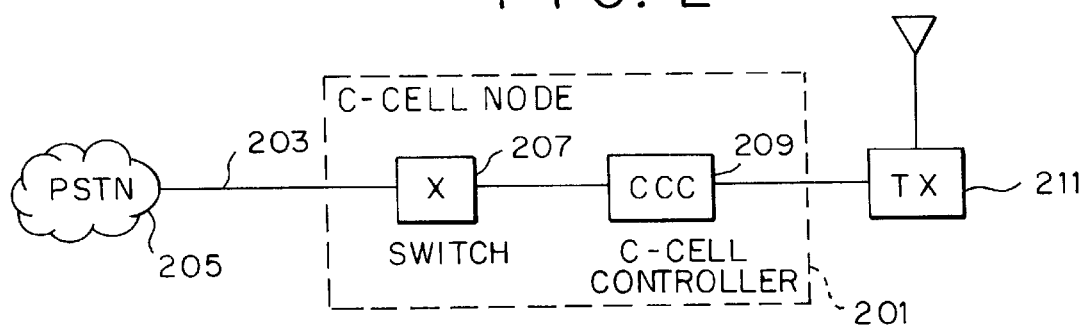
FIG. 2 illustrates a call cell (C-cell) node according to the invention.

Referring to FIG. 2, a central node, C-cell node 201, according to the invention is illustrated. On communications link 203 with PSTN 205, C-cell node 201 receives incoming calls to subscribers. The incoming calls are routed to switch 207 which operates in conjunction with C-cell controller 209. C-cell controller 209, which can include a processor, memory and other suitable analog and digital circuitry, can be used to perform communications functions, call record functions and operation, administrative and maintenance functions. For example, C-cell controller 209 can broadcast requests for Call Detail Records (CDRs) from controllers which maintain such records in the zones. Such CDRs can be received from the zones on modems. Other operational, administrative and maintenance information can be exchanged between C-cell node 201 and the zones in a similar manner.

C-cell controller 209 also performs call communications functions and switch processing of incoming calls. When a call for a portable comes in from the PSTN, C-cell controller 209 maps the incoming call to a portable ID (PIN) number and establishes a call back dial-in number, the node DN. Thus, C-cell node 201 also includes a memory for use in mapping call numbers to PINs. However, according to the invention, it is not necessary for the central node to track the locations of the portables, as in conventional systems.

C-cell controller 209 is also connected to transmitter 211. Transmitter 211 provides a means for broadcasting messages from the central node 201 to the zones. Such broadcasts can be accomplished by paging, by communicating over a cellular data/signalling channel or other radio communications means. In a system according to the invention, C-cell node 201 uses transmitter 211 to broadcast to all the zones including the PIN of a portable being called from PSTN 205 and a temporary dial in number (DN). As discussed further herein, upon detection of its PIN, the zone with the portable pages the portable through a base station. The portable responds to the zone page and commences ringing. When the portable is answered, the zone controller sends a signalling tone to the central node to connect that leg to the incoming call. Thus, the portable in the zone is connected to the PSTN through a call back initiated from the zone to the PSTN on the designated DN in the broadcast. C-cell node 201 using C-cell controller 209 and switch 207 connects the call back from the zone to the incoming call.

Figure 3:
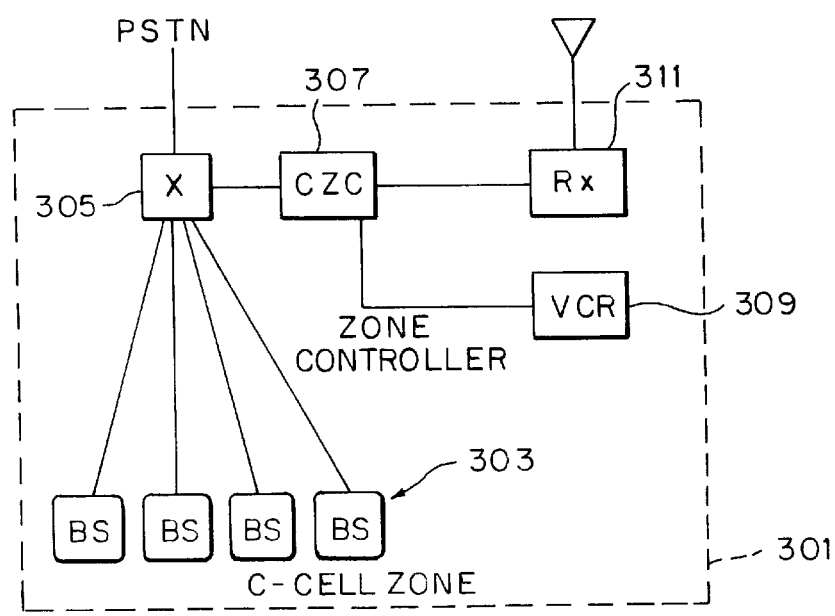
FIG. 3 illustrates a C-cell zone according to the invention.

FIG. 3 illustrates a zone, identified as C-cell zone 301, according to the invention. C-cell zone 301 includes one or more base stations 303, which are connected to switch 305. Switch 305, responsible for mobility management of portables within the zone, is operatively connected to the PSTN as shown, in order to route calls from the zone to the PSTN. Such calls can be initiated by a portable through a base station or by the zone controller to call back to the node DN in response to a call incoming from the PSTN to a portable, as described further herein.

Zone controller 307, which includes a processor and associated circuitry, is also connected to switch 305. As a portable enters a zone, its presence in the zone is registered, for example, by storing the portable's ID number (PIN) in a memory, shown in FIG. 3 as visitor location register (VLR) 309. Under control of zone controller 307, VLR 309 maintains a list of portables currently in the corresponding zone. As a portable leaves the zone, the portable's ID can be deleted from the list stored in VLR 309. The C-cell zone controller 307 can also store and activate restrictions on calls and call related activities.

Receiver 311 is linked to zone controller 307. During operation of a system according to the invention, the receiver 311 in each zone receives the broadcast message of the portable ID number (PIN) from a central node. The receiver 311 also receives the node dial-in number (node DN) from the node for call back. Upon receipt of a portable ID number, the C-cell zone controller 307 initiates a page to the portable. Paging to the zone receiver can be accomplished in cellular, for example, using the bandwidth between channels on a frequency from a distant cell. The portable is then paged by the zone base station. If the portable is present in the cell, it responds through one of the base stations 303.

If the portable is present in the zone, then the zone controller 307 initiates a call to the node DN through switch 305 preparing to connect the portable with the incoming call. As a portable moves within the zone, the communication link with the portable can be transferred among base stations 303 using an appropriate hand-off routine in order to maintain efficient communications, signal quality and call integrity.

Figure 4:
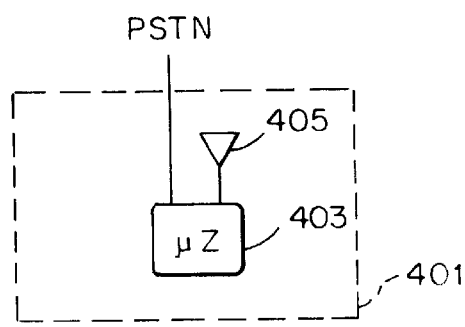
FIG. 4 illustrates a C-cell $\mu$ Zone according to the invention.

An alternative configuration of a zone according to the invention is the C-cell microzone shown in FIG. 4. A microzone 401 has a microzone controller 403 and associated receiver 405 in a stand alone base station. The stand alone base station is connected directly to a PSTN, PBX or other network. A system may have one or more microzones, each performing the functions of the C-cell controller previously discussed including portable registration in a VLR, paging of a called portable, collection of CDRs or other information and transmission of CDRs or other information over a modem. However, since each stand alone base station has its own receiver and is independently connected to the remainder of the network, there is no switching between base stations. Thus, a portable is serviced only by the stand alone base station in which the portable is registered. This elimination of switching allows for the use of lower cost, less complex base stations. In addition, system capacity is expanded simply by incorporating additional stand alone base stations. No hand off is possible between microzones.

Figure 5B:
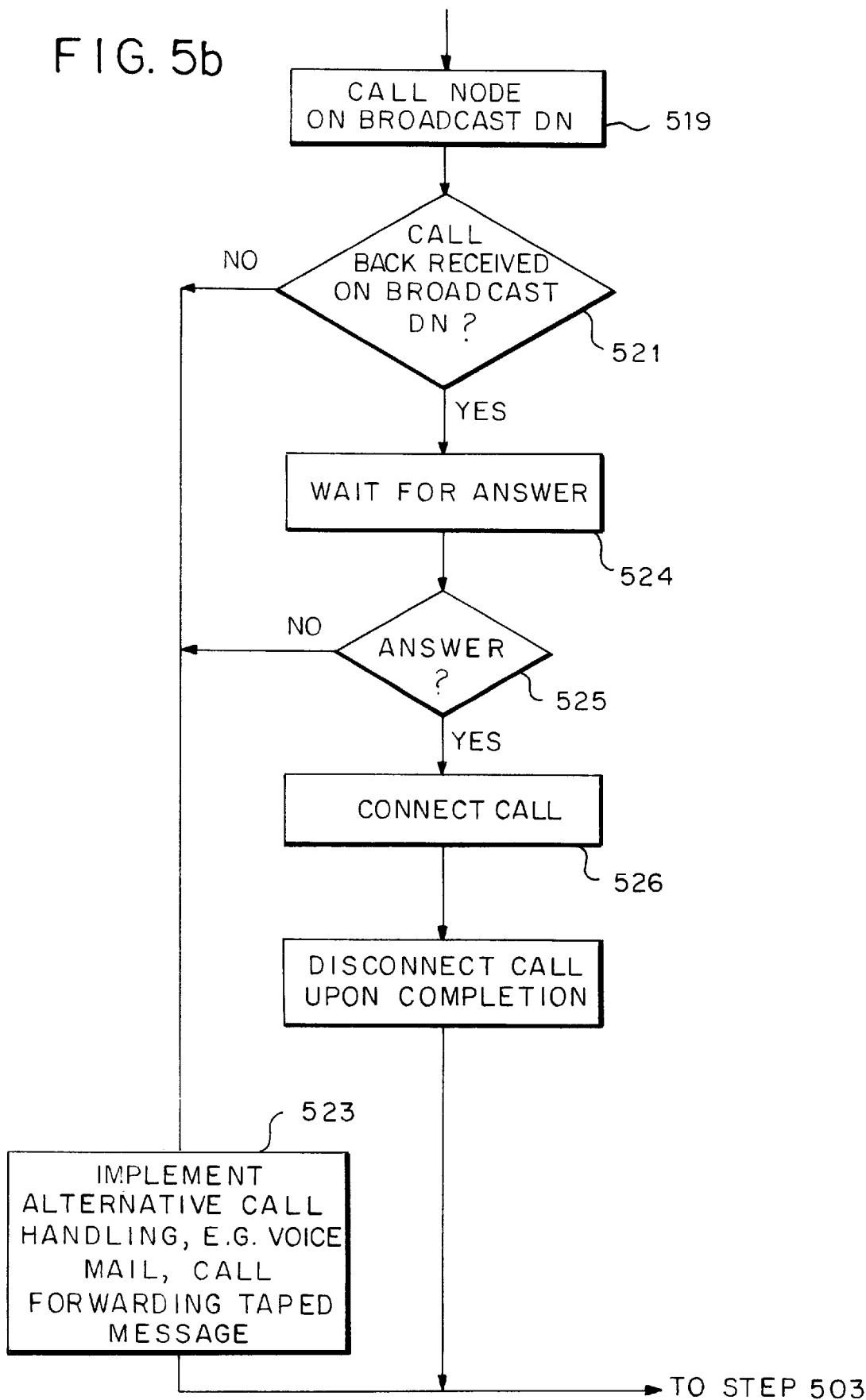

FIGS. 5a and 5b illustrates a flow diagram of how a system according to the invention would operate in general. FIGS. 5a and 5b shows the steps performed both in the central node and the zone. When a portable enters a zone (step 500), it registers its PIN with the zone controller for that node, for example in its VLR, (step 501), thus adding the PIN to the zone controller's VLR for comparison purposes when a broadcast PIN is received, if authentication against a black list of PINs for which service is denied is successful. In the meantime, the zone controller can be executing other background processing for administration, operation and maintenance, e.g. Call Detail Record processing (step 502).

Upon receipt of a call (step 503), the receiving central node obtains the PIN of the portable to where the call is directed, for example, by mapping the called number to the corresponding PIN (step 505). The central node then broadcasts the PIN and node dial-in number via the transmitter to all the nodes (step 507). The receiver in the zones receive the PIN and node DN (step 509). The receiver distinguishes between CDR download messages and incoming call messages at step 510. Downloads are accomplished via a modem (step 512). For incoming calls, the receiver compares the broadcast PIN with those registered in its zone, for example, by accessing its VLR (step 511). If a match is found, indicating that the portable to which the call is directed is registered in the zone (step 513) and the portable is not busy (step 514), the corresponding zone controller immediately pages the designated portable through the base stations (step 515). If the designated portable is in the zone, as indicated by a response to the page (step 517), the zone controller calls back the node indicated by the node ID (step 519). If the central node fails to receive a response to its broadcast within a predetermined time (step 521), the central node can initiate alternate processing (step 523) such as transferring the call to another number, to voice mail, or to a recording. Processing then returns to step 503 where calls can be received. If the portable is in the zone, the central node waits for answer (step 524). Alternate processing is activated if the portable doesn't answer the call (step 525). If the portable answers, the call is connected in step 526. After completion, the call is disconnected in step 527 and processing returns to step 503 where calls can be received.

By way of illustration and not limitation, FIGS. 6–10 illustrate a variety of architectures useful to form a system according to the invention. FIG. 6 shows a C-cell microzone architecture. In this architecture according to the invention, a C-cell microzone 601 has a receiver 603, and a C-cell microzone controller 604 linked to a base station 605. The C-cell microzone controller 604 and base station 605 are also connected to modem 607. Modem 607 and base station 605 are connected to a network such as a PSTN through a shared link 609. Other base stations 611, 613, 615, for example, which can be added incrementally to support increased traffic demands have independent connections 612, 614, 616 to the network and are connected to the C-cell microzone controller 604. In operation, receiver 603 receives broadcast messages, such as CDR download requests and PINs on incoming calls from a central node. The C-cell microzone controller 604, has a VLR to maintain the list of portables registered in the zone, pages the portables and initiates calls to the central node as previously discussed herein. The C-cell microzone controller 604 also collects CDRs, and, for example, on request from the central node, downloads the CDRs to the central node through the modem 607. The C-cell microzone controller 604 can also impose restrictions on calls.

FIG. 7 illustrates a private system architecture according to the invention, in which C-cell central node 701 is connected to an external network such as PSTN 703 through private branch exchange (PBX) 705.

PBX 705 is connected via conventional communication lines 706, 708 to switches 707 and 709 in C-cell zones 711 and 713, respectively. C-cell zones 711 and 713 are formed as previously described herein. PBX 705 is also connected via independent conventional communication lines 715, 716, 717 to C-cell microzones 718, 719, 720. In response to calls incoming to the portables from PSTN 703, C-cell central node control 721 broadcasts the portable's PIN through transmitter 723. The zone controller or microzone controller having the portable registered in its VLR signals the PBX 705 when the portable is answered and the central node 701 then connects the call from the zone to the incoming call from PSTN 703. This arrangement allows a common dialing plan on outgoing calls for all zones connected to the PBX 705 and a set of services common to all users.

FIG. 7 also shows remote zone controllers 725, 727. These remote zones, which are independently connected over conventional lines 726, 728 to the PSTN can receive calls from the PBX based system via their receivers and via the PSTN. Outgoing calls can be made a part of the common dialing plan through automatic direct inward services access (DISA) transparent to the subscriber.

Figure 8:
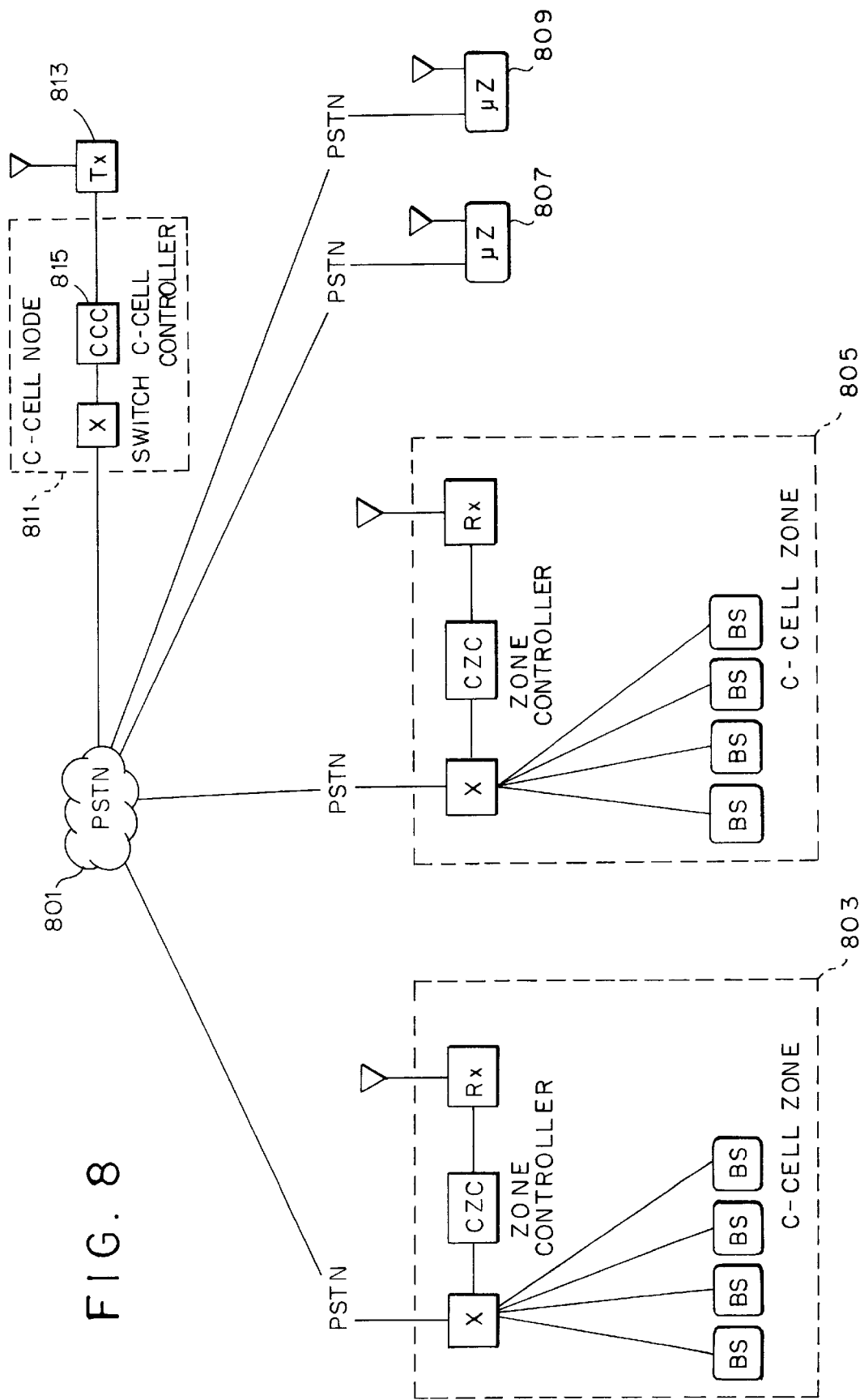
FIG. 8 illustrates an architecture for a public system according to the invention.
Figure 9:
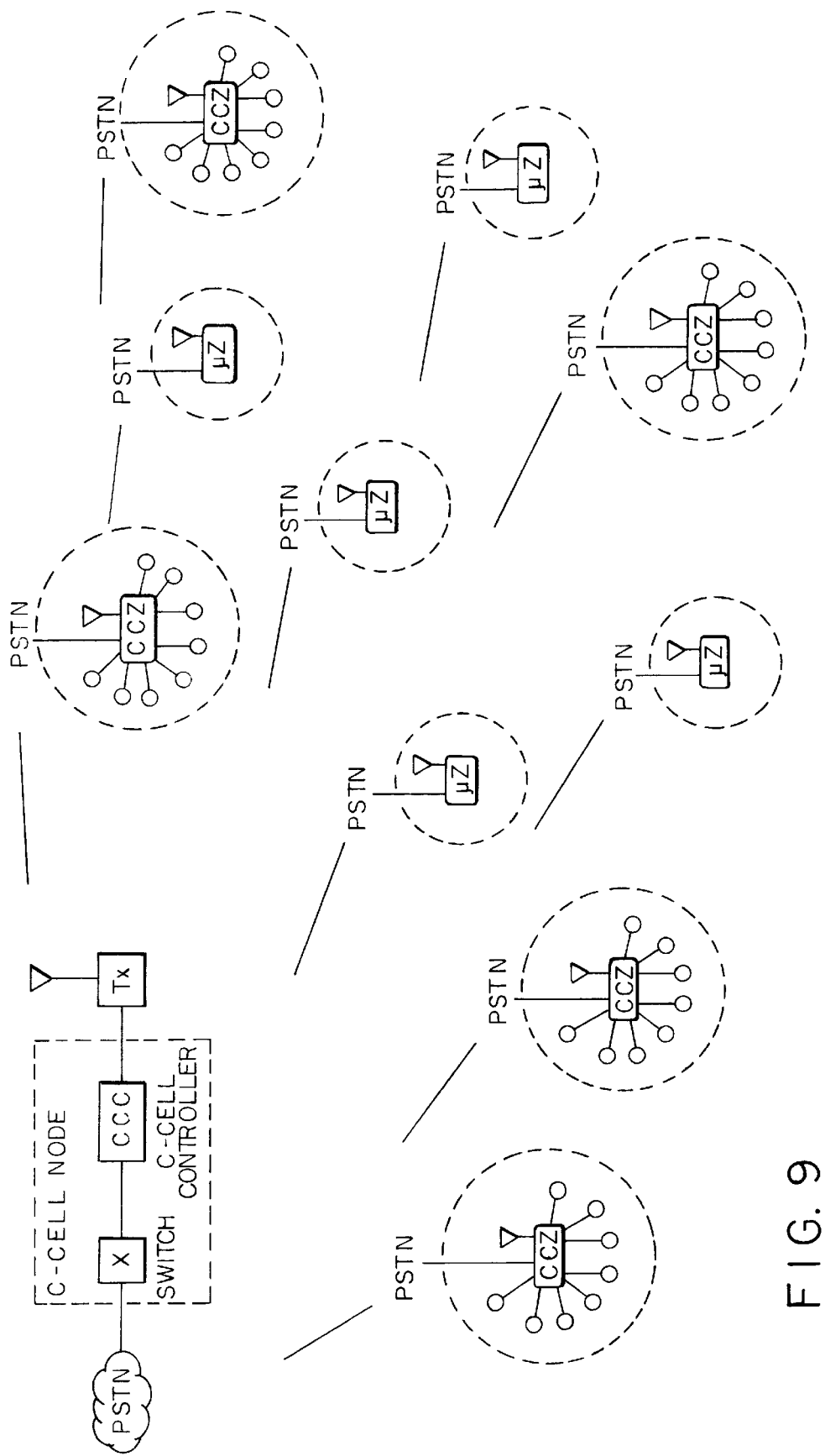
FIG. 9 further illustrates an architecture for a public system according to the invention.

In the public system architecture according to the invention shown in FIG. 8, PSTN 801 is connected via conventional communication lines to C-cell zones 803, 805, microzones 807, 809 and C-cell node 811. Calls to portables from the PSTN are connected by broadcasting the PIN and node DN through the transmitter 813 connected to C-cell node 811 and connecting the call through a call back from the zone having the portable registered, as previously described. Thus, it is only necessary to maintain local VLRs at each zone. It is not necessary for the C-cell node 811 to maintain a home location register (HLR), as is required in conventional systems.

It should also be noted that the C-cell controller 815 can be used to maintain and update a black list of PINs which the system will not service. The C-cell controller 815 can update all zones with this black information through a single message broadcast through transmitter 813.

Service can be provide to users registered with other service providers upon authorization from the central node. Such authorization can be obtained from an inquiry to the central node by the zone controller using its modem. This considerably enhances system flexibility.

It will be known to those of ordinary skill that any number of zones and microzones can be arranged to configure a system according to the invention. Another example is given in FIG. 9.

Figure 10:
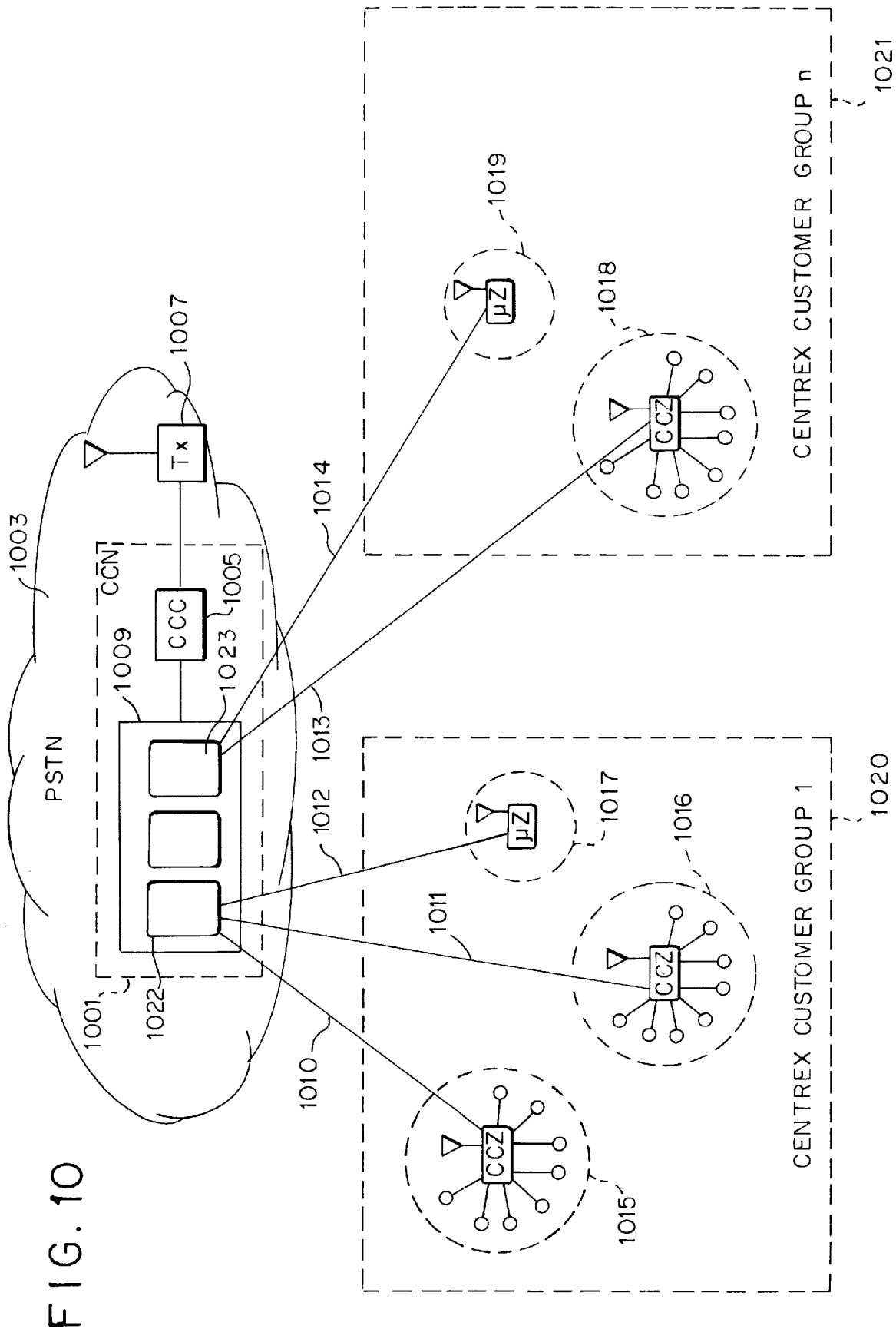
FIG. 10 illustrates an architecture for a centrex system according to the invention.

FIG. 10 illustrates another system configuration according to the invention. In FIG. 10 a C-cell node 1001 within PSTN 1003 has a C-cell controller 1005 connected between transmitter 1007 and centrex switch 1009. Centrex lines 1010–1014 are connected to zones 1015–1019 respectively. The zones are organized in centrex customer groups 1020, 1021.

The zones in each customer group are linked to the corresponding customer group 1022, 1023 in the centrex switch to implement that customer's dialing plan. Operation according to the invention is as previously described with the PIN of an incoming call being broadcast by transmitter 1007 to all of the zones 1015–1019. The zone in which the portable is located responds by initiating a call back on the broadcast DN according to its dialing plan through its sub-controller 1022, 1023 and controller 1009 in order to link the portable to the incoming call.

As indicated above, the method according to the invention can be employed to configure a system which can be used in multiple architectures. By broadcasting the PIN of the portable to receive the incoming call and a DN call back number to the zones, the requirement for live links is eliminated and communication bottlenecks are avoided.

Other embodiments of the invention will be apparent to those skilled in the art from consideration of the specification and practice of the invention disclosed herein. It is intended that the specification be considered as exemplary only, with the true scope and spirit of the invention being indicated by the following claims.

What is claimed is:

1. A zoned communication network comprising:
   a central node; and
   at least two zone cells, each having a plurality of base stations and a zone controller for controlling an associated zone cell, said zone controller including a visitor location register that is distinct from said plurality of base stations and that maintains a list of portables currently in said zone cell such that said central node need not maintain a home location register for storing a list of locations of portables,
   wherein said central node establishes a communication link between an incoming call received at said central node and a portable in said zone cell, said zone controller registering an identifier of said portable in said visitor location register as said portable enters said zone cell and being responsive to an indication of said incoming call from said central node to page said portable and signal said central node to establish said communication link if said portable is available to receive said incoming call, said zone controller deleting said identifier of said portable from said visitor location register when said portable leaves said zone cell, said zone controller storing an updatable black list of identifiers of portables that said network will not service.

2. The network recited in claim 1, wherein said central node comprises a transmitter responsive to said incoming call to broadcast said identifier to each said zone cell.

3. The network recited in claim 1, wherein each said central node comprises a timer set to command said central node to forward said incoming call to another communication device if said portable is unavailable to receive said incoming call within a predetermined time of said page of said portable.

4. The network recited in claim 1, wherein each said zone cell comprises a modem responsive to a command broadcast from said central node to route Call Detail Records to said central node over said modem.

5. The network recited in claim 1, wherein each said zone controller comprises call initiating circuitry to signal said central node to establish said communications link by initiating a call back to said central node.

6. The network recited in claim 5, wherein said call back to said central node is routed through a communication line.

7. The network recited in claim 6, wherein said communication line is one of a line of a public switched telephone network, a line of a private branch exchange and a centrex line.

8. The network recited in claim 7, wherein each said zone controller is connected directly to one of said public switched telephone network, said private branch exchange, and a centrex controller.

9. The network recited in claim 6, wherein each said zone controller is connected to a plurality of base stations, each base station being connected directly to said one of said public switched telephone network and said private branch exchange.

10. The network recited in claim 1, wherein each said central node comprises a switch for receiving and transmitting calls between a public switched telephone network and a node controller directing operation of said zone controller.

11. The network recited in claim 1, wherein each said zone cell comprises a receiver for receiving messages from said central node, said associated zone controller receiving said messages from said receiver.

12. The network recited in claim 11, wherein said associated zone controller routes said incoming call to one of said plurality of base stations, and said one base station routes said incoming call to said portable.

13. The network recited in claim 12, wherein each said zone cell further comprises a switch controlled by said associated zone controller to route said incoming call to said base stations, said switch controller also being connected to a public switched telephone network to provide said signal to said central node to establish said communications link from said zone controller.

14. The network recited in claim 12, wherein at least one of said plurality of base stations is directly connected to one of a public switched telephone network and a private branch exchange.

15. The network recited in claim 13, wherein at least one of said plurality of base stations is directly connected to one of a public switched telephone network and a private branch exchange.

16. The network recited in claim 12, wherein said base stations comprises means for handing off said portable among said base stations as said portable moves within said zone cell.

17. A method of communication in a zoned network, the method comprising the steps of:

providing a zoned network having a central node and at least two zone cells, each of said at least two zone cells having a plurality of base stations and a zone controller for controlling an associated zone cell, said zone controller including a visitor location register that is distinct from said plurality of base stations and that maintains a list of portables currently in said zone cell such that said central node need not maintain a home location register for storing a list of locations of portables, storing an updatable black list of identifiers of portables that the network will not service in each said visitor location register;

registering an identifier of a portable in said visitor location register of a zone cell as said portable enters said zone cell, provided said identifier does not appear in said updatable black list;

upon receipt of an incoming message for said portable from a central node, paging said portable from said zone cell;

signaling said central node from said zone cell to establish a communication link with said portable, if said portable is available to receive said incoming call; and deleting said identifier of said portable from said visitor location register when said portable leaves said zone cell.

18. The method recited in claim 17 further comprising the step of:

in response to said incoming call, broadcasting via said central node said identifier to each said zone cell.

19. The method recited in claim 17 further comprising the step of:

forwarding said incoming call via said central node to another communication device if said portable is unavailable to receive said incoming messages within a predetermined time of said page of said portable.

* * * * *